Figure 1:
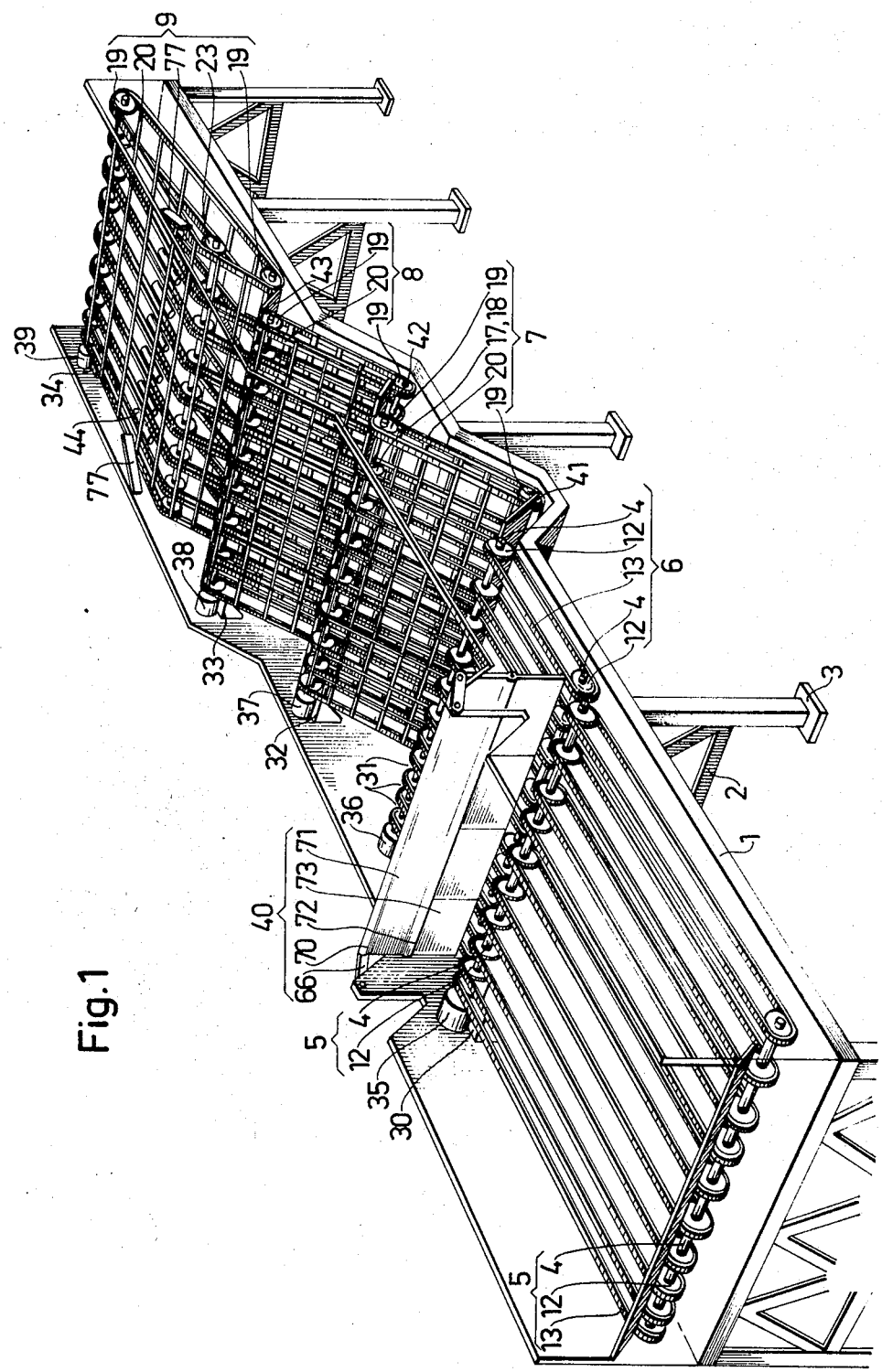

United States Patent [19]

Jönsson et al.

[11] 3,771,641

[45] Nov. 13, 1973

[54] METHOD AND AN APPARATUS FOR CONVEYING ELONGATED OBJECTS ONE-BY-ONE

[75] Inventors: Karl-Erik Jönsson; Olof Edvin Frisk, both of Ornskoldsvik, Sweden

[73] Assignee: Mo Och Domsjo Aktiebolag, Ornskoldsvik, Sweden

[22] Filed: Sept. 2, 1971

[21] Appl. No.: 177,898

Related U.S. Application Data

[63] Continuation-in-part of Ser. No. 847,283, Aug. 4, 1969, abandoned.

[30]    Foreign Application Priority Data

Aug. 2, 1968   Sweden............................. 10521/68

[52] U.S. Cl..................................... 198/34, 198/76
[51] Int. Cl........................................ B65g 47/26
[58] Field of Search................................. 198/34, 76

[56]       References Cited
FOREIGN PATENTS OR APPLICATIONS

| | | | |
|---|---|---|---|
| 1,277,127 | 6/1966 | Germany............................. | 198/34 |
| 181,518 | 11/1962 | Sweden............................... | 198/34 |
| 188,138 | 3/1964 | Sweden............................... | 198/34 |

*Primary Examiner*—Gerald M. Forlenza
*Assistant Examiner*—George F. Abraham
*Attorney*—Janes & Chapman

[57]            ABSTRACT

A process and apparatus for conveying elongated objects such as logs one-by-one and sideways from one place to another is provided. The objects are first conveyed along a horizontal path, with control of the quantity conveyed per unit of time, and then transported through two or more sequentially arranged upwardly inclined sections, such as chain conveyors, at an angle to the horizontal within the range from about 35° to about 55°, of such magnitude that the objects thereon attempt to assume a horizontal position, with their longitudinal axis perpendicular to the conveying direction. The conveying speed in each stage is increased in the conveying direction so as to separate the objects one from the other, from those in the more slowly moving sections, and cause them to be delivered one-by-one to the place of delivery.

14 Claims, 9 Drawing Figures

METHOD AND AN APPARATUS FOR CONVEYING ELONGATED OBJECTS ONE-BY-ONE

This application is a continuation-in-part of Ser. No. 847,283, filed Aug. 4, 1969, and now abandoned.

The present invention is concerned with a method and an apparatus for conveying elongated objects, preferably objects having a round cross section, from a storage or receiving station to a delivery station at which the objects are delivered one-by-one, with a short interval between the arrival of individual objects. The objects may comprise logs, pipes or other essentially cylindrical objects which are to be moved from a store or receiving station, for example a receiving platform, timber pocket or the like, and transported sideways to a delivery station, for example in connection with an apparatus for sorting, measuring, disintegrating or, in the case of round wood, debarking the objects, or a conveyor belt or a transport carriage etc. For the sake of convenience, however, the following description will be made with reference to logs as the objects being transported, although the invention is by no means restricted solely to logs.

Previously known methods and apparatus adapted for conveying logs in the manner described from a receiving station to a delivery station are incapable of transporting the logs one-by-one and at right angles to the conveying direction in a satisfactory and reliable manner, but result in several logs arriving at the delivery station at the same time. There are several reasons for this. For instance, such apparatus usually comprise chain or belt conveyors provided with pusher members, dogs, carrier arms and like devices adapted to hook into, engage or grip the log when coming into contact therewith. This renders the apparatus particularly unsuitable for feeding one-by-one cylindrical objects of varying size in cross section or such objects having an uneven surface. This is particularly true in the case of logs, tree trunks and the like, which as a rule vary quite considerably in diameter along their length and the rough surfaces of which afford particular ease of attachment to the pusher members.

Another factor which detracts from the usefulness of such apparatus is their low capacity. This is correlated with the difficulty of separating objects such as logs, which have collected in heaps on the conveyor, so that the logs are positively conveyed one-by-one. The solutions to this problem hitherto suggested have meant that either the capacity of the apparatus has a result been considerably lowered or that only a few (if any) of the logs are conveyed one-by-one.

In turn, this is because the apparatus, without exception, have been provided with only one conveyor suitably inclined so as to align the logs, and that hitherto it has not been possible to construct such a conveyor, or to provide it with auxiliary devices, so that it is able to convey reliably and at high apparatus capacity logs one-by-one from a station in which they are piled in disarray, to a delivery station. Those systems of this type which are known to the prior art and which can actually be relied upon to advance the logs one-by-one are therefore intended for intermittent operation. The capacity of these apparatus, however, is very low and they are complicated and expensive.

In contradistinction to known methods and systems of the type described, the method and apparatus of the invention enable the logs to be transported continuously, afford high apparatus capacity and reliable one-by-one delivery of the logs at the output end of the apparatus. Furthermore, the apparatus of the invention is of simple design and is inexpensive in operation and to manufacture.

The method of the invention is mainly characterized in that the logs are first conveyed along a horizontal path on which the flow of logs, i.e. the quantity of logs conveyed per unit of time, is equalized, and then transported through two or more sequentially arranged upwardly inclined stages, all the horizontally conveying stages being essentially on the same horizontal level, and the upwardly inclined stages forming an angle to the horizontal within the range from about 35° to about 55°, of such magnitude that the logs being conveyed attempt to take a horizontal position during transport with the longitudinal axix perpendicular to the conveying direction. The conveying speed of each stage is increased in the conveying direction, thereby separating the logs one from the other, and causing the same to be delivered one-by-one to the delivery station.

The apparatus of the invetnion is mainly characterized by two or more sequentially arranged chain conveyors adapted to feed the logs horizontally, and two or more sequentially arranged inclined chain conveyors placed before the first mentioned conveyors in the conveying direction, and disposed at an angle to the horizontal within the range from about 35° to about 55°, and provided with pusher members and adapted to move the logs obliquely upwards in stages. The flow of logs along the horizontal path is equalized by means of a stripper device arranged transversely of the path and between two adjacent conveyors, and the logs are separated from each other by the fact that each of said inclined conveyors is adapted to carry out one of the conveying steps and is preceded by a sloping pocket or slide or roller path, sloping surface or the like, at an angle to the horizontal within the range from about 10° to 50° and which extends from the output end of one conveyor obliquely downwards and in the conveying direction to the input side of the next conveyor in line and on which the logs are transferred between the conveyors and which have an operation speed which exceeds the speed of the immediately preceding conveyor.

Figure 2:
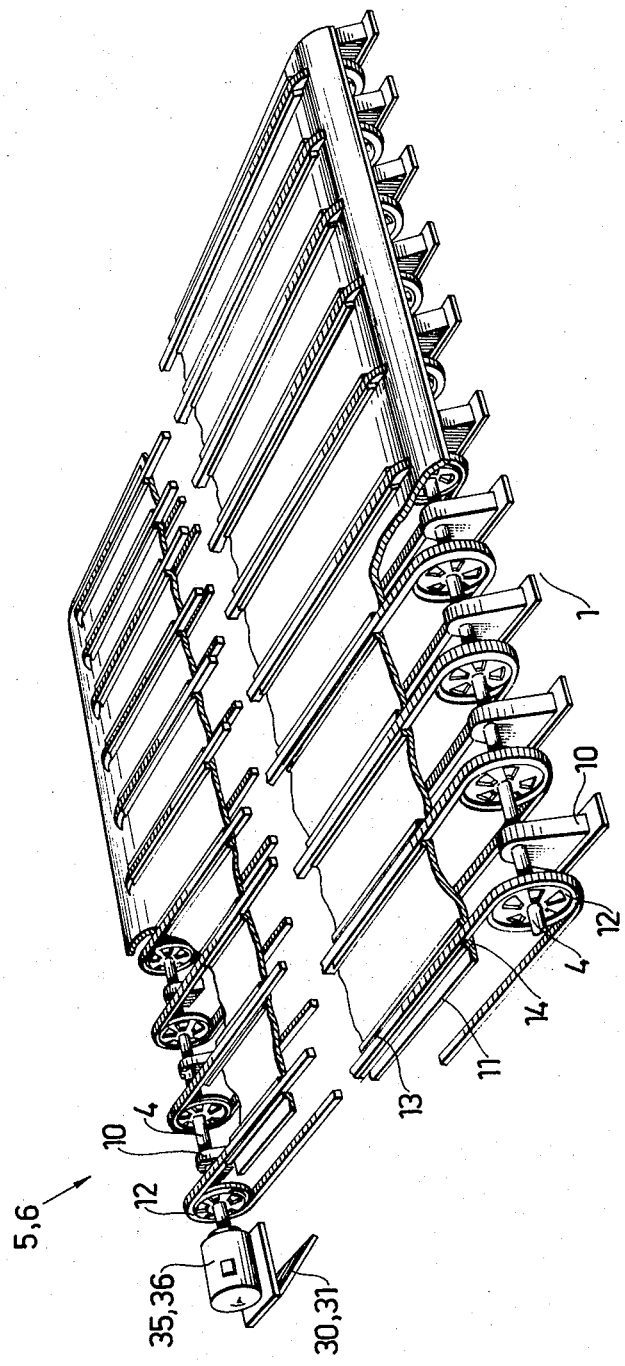
Figure 3:
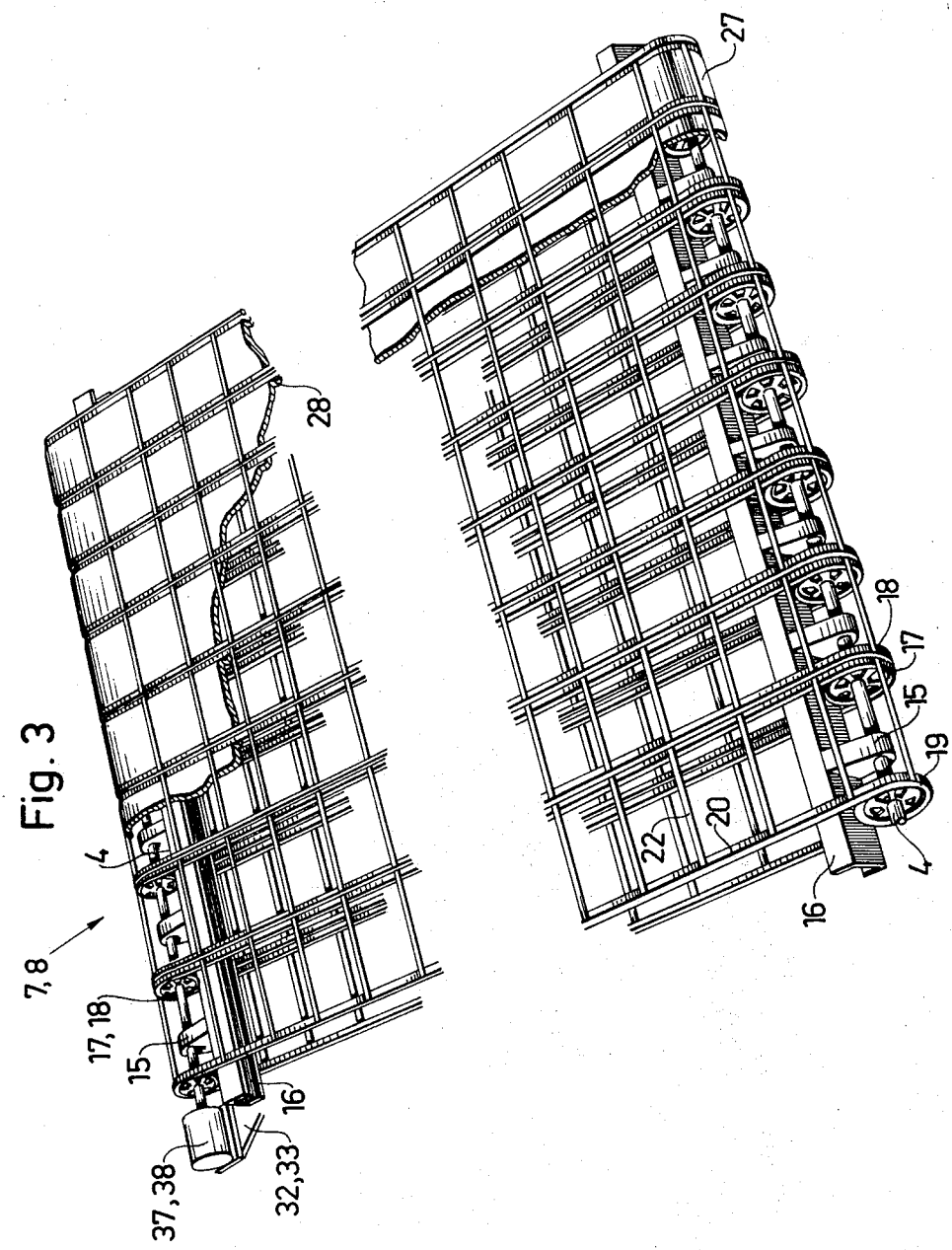
Figure 4:
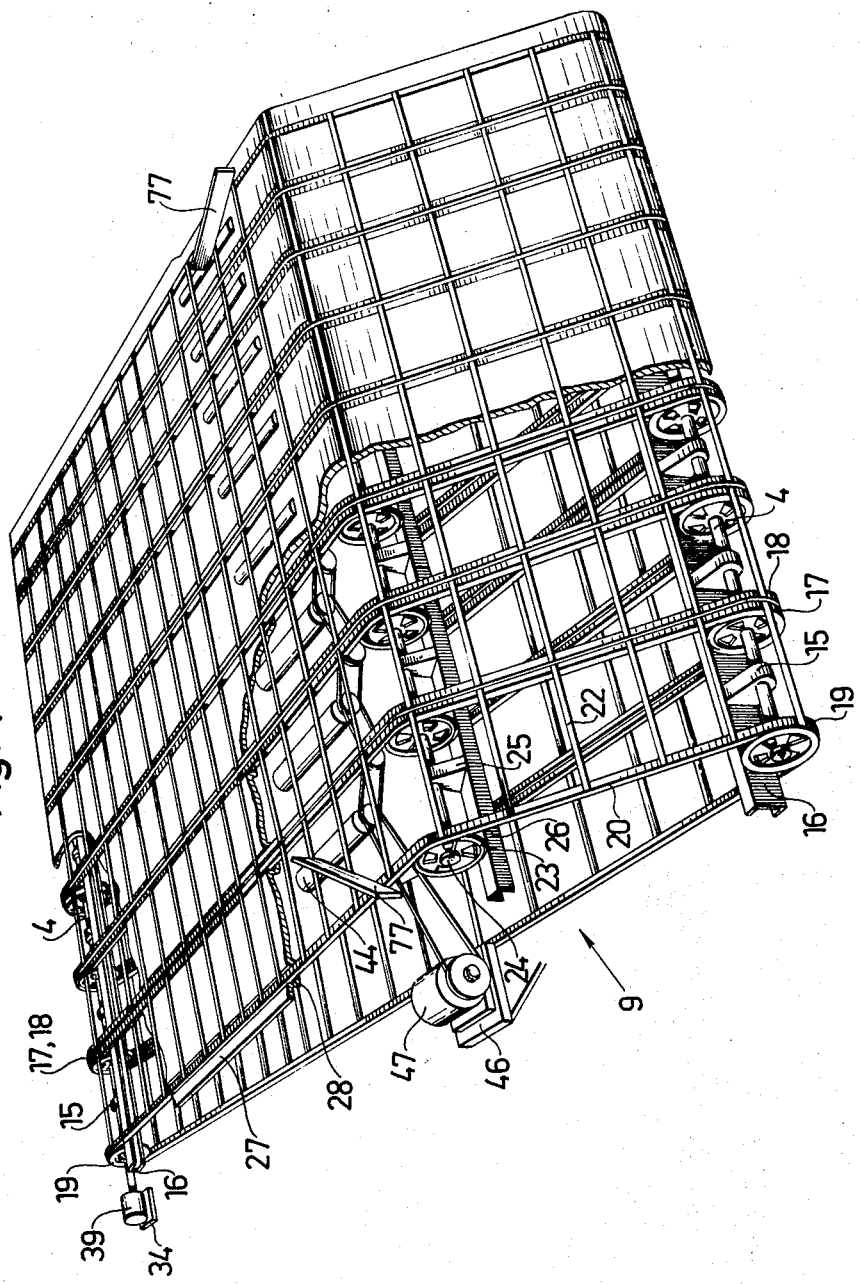
Figure 5:
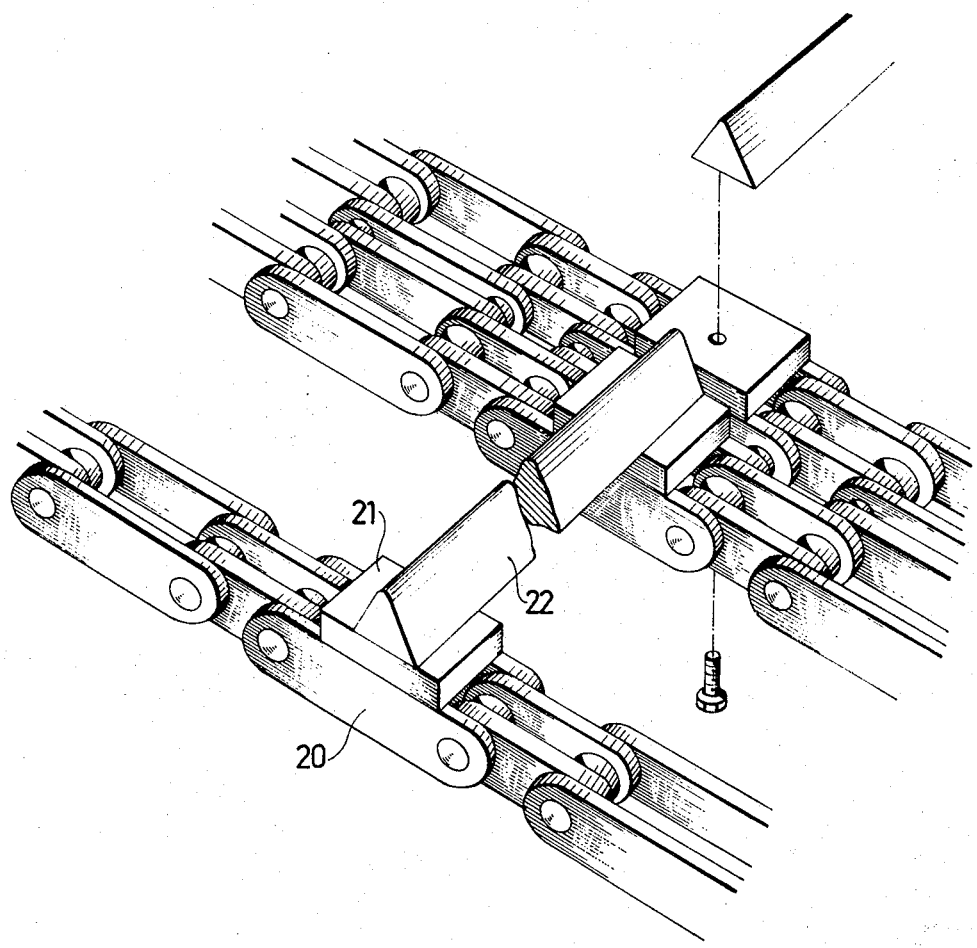
Figure 6:
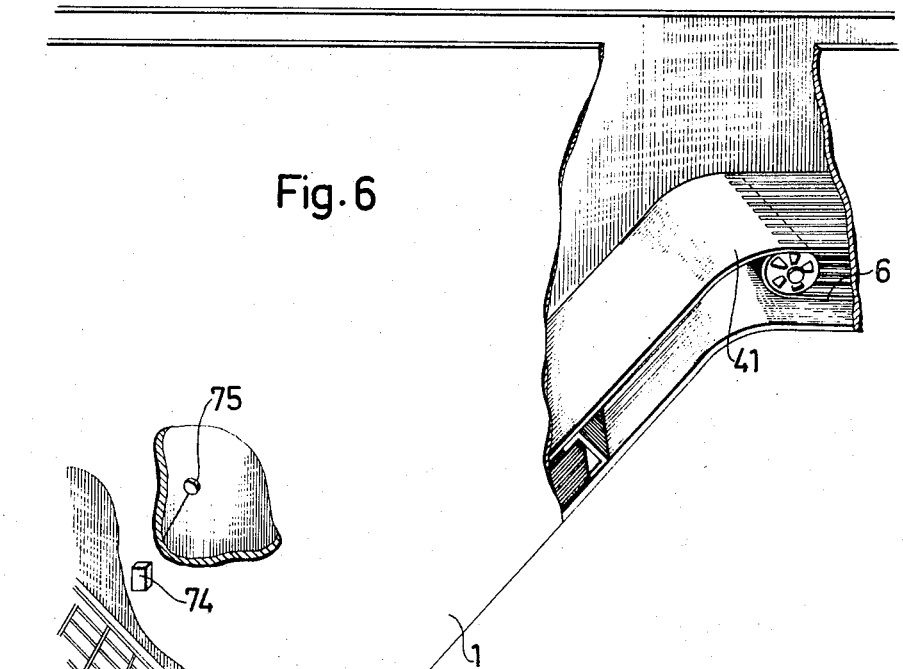
Figure 9:
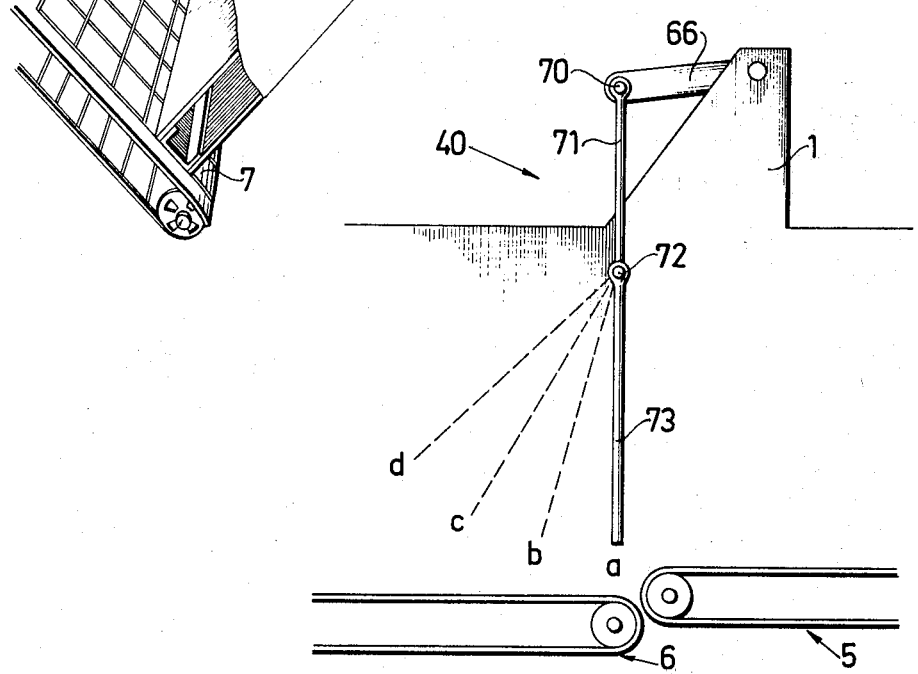
Figure 7:
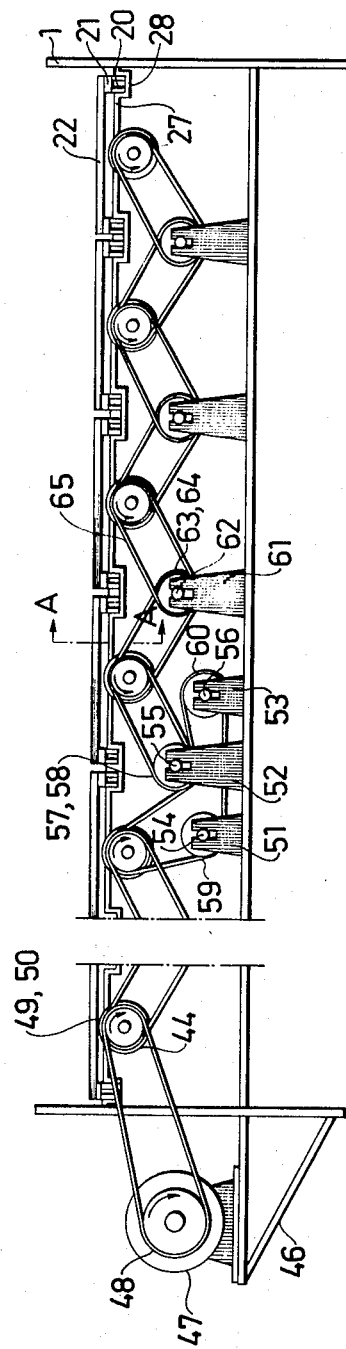
Figure 8:
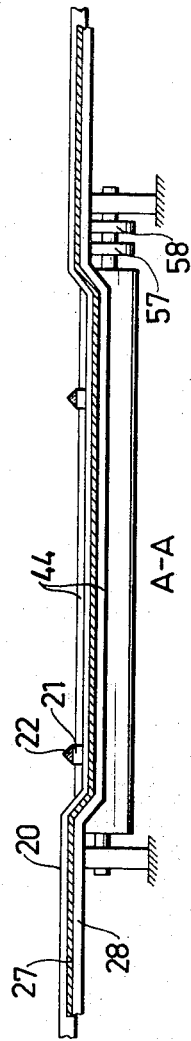

The invention will now be described with reference to an embodiment thereof illustrated in the accompanying drawings, of which FIG. 1 is a total view of the apparatus, having five conveyors arranged in sequence, FIG. 2 is a detailed and partly cut away view of the two horizontal and substantially identical conveyors of the apparatus, FIG. 3 is a detailed and partly cut away view of two inclined and identical conveyors of the apparatus, arranged in sequence behind the conveyors of FIG. 2, FIG. 4 is a detailed and partly cut away view of the conveyor arranged at the output end of the apparatus, FIG. 5 illustrates a portion of a dog or carrier member and its attachment to the conveyors of FIGS. 3 and 4, FIG. 6 illustrates a slide path with associated photocell for controlling the flow of goods per unit of time transferred between two conveyors, FIG. 7 is a cross-sectional view of an arrangement for centering the transported objects with respect to a symmetry line extending longitudinally through the apparatus of FIG. 1, FIG. 8 is a longitudinal section through the apparatus, taken along the line A—A in FIG. 7, and FIG. 9 illustrates diagrammatically an arrangement for controlling the amount of goods transferred between the two horizontal conveyors.

The reference numeral 1 in FIG. 1 identifies an elongated, box-like open-top frame supported by a base 2 of lattice construction. The base is arranged on concrete posts 3, placed in the ground. Five chain conveyors 5, 6, 7, 8, 9 are arranged in sequence in the frame, the conveyors being intended for the transportation of wood, such as logs, and each moving in the same direction. The conveyors 5, 6 extend horizontally while the conveyors 7 and 8 form an angle of 45° to the horizontal, but the angle suitably can be within the range from about 35° to about 55°. The conveyor 9 is constructed so that approximately one fifth of its length seen from the input end extends parallel with the conveyors 7 and 8, while the remainder of the conveyor extends horizontally. Conveyors 5 and 6 and 7, 8, 9, are of the same construction, with the exception that conveyor 5 is longer than conveyor 6 and that, contrary to conveyors 7 and 8, the major portion of conveyor 9 extends horizontally.

Each of conveyors 5 and 6 includes two parallel shafts 4 supported by ten bearings 10, attached to the frame in uniform spaced relationship (FIG. 2). Adjacent each bearing there is mounted on the shaft 4 a chain wheel 12. Extending between the confronting chain wheels of respective conveyors and engaging therewith is an endless chain 13 which consists of a series of interpivotally connected link pairs. The upper portion of the chains is supported and guided by channels 14 extending in the conveying direction and arranged in a horizontal plate 11 (FIG. 2). The plate 11 is not shown in FIG. 1. The side edges of the channels 14, however, are not so high as to prevent the upper part of the chains from protruding above said channels.

Each of the conveyors 7, 8, 9 includes two shafts 4 each of which is supported by eight bearings 15 (FIGS. 3 and 4). The bearings are secured in uniformed spaced relationship to the frame via a beam 16. On each shaft is a pair of chain wheels 17, 18 arranged in the space between adjacent bearings 15, while a chain wheel 19 is mounted externally of each outer bearing. Extending between confronting chain wheels on the shafts of respective conveyors and in engagement therewith is an endless chain 20, which is of the same construction as the chains 13. A rectangular attachment plate 21 is secured as by welding onto the outwardly facing side of each fourth link in chains 20 (FIG. 5). The chains are interconnected by a carrier or pusher member 22, one bolted to each attachment plate as shown in the Figure.

The pusher member presents an essentially triangular cross-section and the outwardly directed edge is rounded to a radius of approximately 20 mm and extends over the whole width of the conveyor. When the pusher member 22 is moved obliquely upwards by the chain, its surface facing in the conveying direction forms an angle of 15° to the horizontal with the rounded corner as the highest point. In the junction between the inclined and the horizontal portion of the chains of conveyor 9, said chains extend with the upper part over chain wheels 23, which are affixed on a shaft 24. The shaft is journalled for rotation in bearings 25 supported by a beam 26 secured in the frame. Similarly to the chains 13, the upper portion of the chains of conveyors 7, 8, 9 is guided by channels 28 arranged in a horizontal plate 27 (not shown in FIG. 1). In contradistinction to the channels 14, however, channels 28 are submerged in the plate 27.

Attached to the outside of frame 1 are five brackets 30, 31, 32, 33, 34. Each bracket supports a hydraulic motor 35, 36, 37, 38, 39, which is connected to the front shaft of the adjacent conveyor.

The conveyor 5 at the input end of the frame is arranged immediately adjacent the conveyor 6 and at a slightly higher level therewith. Between and above the conveyors is arranged a regulating means 40 (FIG. 1) by which the thickness of the layers of wood transferred between the conveyors is automatically regulated whilst at the same time the logs are aligned. All conveyors 6, 7, 8, 9 are arranged at a certain distance apart. Hence the output end of each conveyor is at a higher level than the input end of the following conveyor. In each space between the conveyors 6, 7, 8, 9 is a slide path 41, 42, 43, secured in the frame, on which the wood is transferred between the conveyors.

The slide paths 41, 42, 43 are directed obliquely downwards in the conveying direction. Because the amount of wood per unit of length of the conveyor path decreases in the conveying direction the slide paths have been adapted to slope so that in the order in which they are mentioned above they form respective angles of 45°, 30° and 20° to the horizontal.

Mounted for rotation in the front portion of the frame 1 at the horizontal portion of conveyor 9 are eight cylindrical rollers 44 (see also FIG. 7). The rollers extend in the horizontal plane parallel to one another and to the conveying direction, and extend to a level with the upwardly turned portion of the cylindrical surface between and slightly above the upper portion of adjacent conveyor chains 20. The number of rollers is uniformally distributed on both sides of the symmetry line of the frame. Securely fixed to the outside of the frame is a bracket member 46, which carries a hydraulic motor 47. The motor is connected to the rollers by a chain transmission so that the rollers to the right of the symmetry line of the frame rotate counterclockwise and the rollers to the left of said line rotate clockwise.

In the embodiment of FIG. 7, the reference numeral 48 identifies a chain wheel securely mounted on the motor shaft, while the reference numerals 49, 50 identify two chain wheels securely mounted on the rear end of the shaft of each roller. The chain wheels 50 are arranged in line with one another and the nearest shaft end, and the chain wheels 49 are in line with each other and the chain wheel 48 of the motor. Fixedly mounted in the frame between the chain wheels of the two centre rollers are three bearing blocks 51, 52, 53. The bearing blocks are provided with vertical slots in which shafts 54, 55, 56, which extend parallel to the rollers, are securely screwed. By loosening the screws, it is possible to move the shafts vertically in the slots. Loosely mounted on the shafts are four chain wheels 57, 58, 59, 60, of which wheels 57, 58 are mounted on the shaft 55 and wheels 59, 60 on shaft 54 and shaft 56 respectively. The chain wheel 57 is thus in line with the chain wheel 48 of the motor and the chain wheel 49 of the rollers, while the chain wheels 58, 59, 60 are in line with each other and with the chain wheel 50 of the rollers.

In each space between the remaining rollers and between their chain wheels there is a bearing block 61 fixedly attached in the frame. This bearing block is also provided with a vertical slot, in which a shaft 62 is securely screwed, similar to shafts 54, 55, 56. On each shaft 62 there are loosely mounted two chain wheels 63, 64, the wheel 63 is mounted so as to be in line with wheels 48, 49, 57 and the wheel 64 mounted so as to be in line with wheels 50, 58, 59, 60.

As will be seen from the drawing, the chain wheels engage each other over chains 65. The tension in the chains can be regulated by moving the shafts 54, 55, 56, 62 in the slots in the bearing blocks. The direction in which the motor and rollers rotate is shown on the drawing. As is clearly shown, the rollers to the right of the symmetry line of the frame rotate counter-clockwise when the motor is started, while the rollers to the left of said line rotate in a clockwise direction. When a log or the like is moved crosswise on the conveyor chains in contact with the rollers it will consequently be moved laterally by the rollers until its ends are located essentially at the same distance from the symmetry line of the frame.

To ensure that the logs bear against the rollers when passing over the same, the channels in which the chains of the conveyors run have been bent downwards, so that the chains run on a slightly lower level than the rollers in the space therebetween (FIG. 8). Two guide plates 77 are each fixedly attached to the frame immediately above the two outer rollers and the chains, so that they project from one end adjacent the wall of the frame obliquely forwards at an angle of about 15° with the conveying direction (FIG. 1).

The regulating means 40 (FIGS. 1 and 9) comprises two arms 66, which are pivotally mounted in the frame walls and which can be locked thereto in selected positions by means of appropriate locking devices (not shown). The arms extend from their pivot point in the conveying direction and are securely interconnected at their forward ends by means of a shaft 70. A rectangular plate 71 is pivotally mounted at one long side about the shaft 70 and hangs vertically therefrom. In its lower portion, the plate 71 is provided with a shaft 72 on which are pivotally mounted four rectangular plates 73. These plates also hang vertically from the shaft. The plates 73 extend sequentially across the frame 1 and are separated by a gap which allows them to pivot independently. Since the plates 71 and 73 hang vertically downwards they lie essentially opposite the rear shaft of the conveyor 6 and at a certain distance from the chains of the conveyor. This distance can be adjusted by rotating and locking the arms 66 to and in selected positions of the frame. To these ends, the arms are provided with turning and latching means (not shown).

The postion taken up by the plates in relation to the vertical line when the apparatus is in operation depends upon the distance to the underlying chains and to the amount of wood passing between the conveyors which upon contacting the plates causes said plates to pivot. By means of some suitable arrangement (not shown) the speed of the motor of conveyor 5 is regulated in dependence of the angle which the plates 73 form with the vertical. The speed of the motor is regulated in increments, so that the r.p.m. is changed at certain preselected positions of the plates.

The relationship between the positions of the plates and the regulation of the r.p.m. is illustrated in FIG. 9, the positions being marked a, b, c, d. When the plates are in position a, the motor of conveyor 5 runs at full speed. When the plates are rotated clockwise from a to d they reduce the speed of the motor when passing c by about 75%, and stop the motor when reaching position d. When the plates are moved from this position to position a, the motor is started at c, and the r.p.m. increased to about 25%. Continued movement of the plates will produce full motor speed at b. When the motor is running at full speed the speed of the conveyor chains is approximately 4 meters per minute. The quantity of wood transferred between the conveyors 5 and 6 is automatically regulated by means of the described motor speed regulating process, so that a uniform flow is obtained. This flow can also be regulated manually, by raising or lowering the arms 66.

Regulating means have also been provided between the other conveyors, for the purpose of controlling the flow of material therebetween. These latter means comprise a photocell, arranged on the frame between respective slide path and the preceding conveyor. FIG. 6 illustrates by way of an example the conveyor 7 and the slide path 41 and corresponding photocell 74. Each photocell is connected to a time relay, to delay the reactions of the photocell. A light source 75 directed against the cell is mounted on the opposite side of the frame. The photocell and associated light source can be moved manually vertically along the frame wall and locked thereto by appropriate latching means. Each photocell is connected via a time relay to the motor on the conveyor preceding the slide path to regulate stepwise the speed of the motor. The speed of the motor is regulated in the following manner. When the level of the wood between the slide path and the conveyor in front of said path rises, thereby breaking the light beam emanating from the light source, the speed of the motor associated with the conveyor immediately preceding the slide path is reduced, after a time lapse determined by the time relay, in the present case about 2 seconds, thereby reducing the supply of wood to the slide path. When the level of the wood falls, allowing the beam of light to pass unbroken, the photocell is actuated and, subsequent to a certain delay, the motor speed increases to full r.p.m. The action of the time relay prevents the photocells from adjusting the motor speed when the beam is broken by the odd log.

The different speeds which can be given to the conveyors 6, 7, 8, 9 are in said sequence 3 and 8, 16 and 32, 16.8 and 33.6, and 17.6 and 32.2 meters, per minute, respectively. Of course there may be more than one photocell and light source provided for each regulating means, the number of stages in which the motor speed is adjusted being increased to a corresponding degree. This also applies to the regulating means 40 insofar as the number of means for registering the different positions of the plates can be increased and therewith the number of regulating stages.

The operation of the apparatus is such that subsequent to a bundle of logs being placed crosswise over the conveyor chains, by means of a fork lift truck for example, the logs are conveyed by the belts toward the vertically hanging plates 73 of the regulating means 40. As the wood contacts the plates the plates are pivoted by the wood and the upper logs temporarily retained by the plates while the logs lower in the pile pass under the same. If the quantity of wood fed to the system by the truck is greater than that which the plates are capable of allowing to pass through per unit of time the quantity of wood at the rear of the plates — seen in the conveying direction — will increase until it reduces the speed of the motor of conveyor 5 or stops it completely, in the manner described. At the same time as the quantity of wood regulated in this manner the logs are aligned by the plates with respect to the conveying direction.

The logs arriving on the conveyor 6 form a uniform layer which completely covers the whole of the conveyor. At the output end of the conveyor the logs slide downwards along the slide path 41 until the leading logs bear against the chains of conveyor 7. The logs are then moved in a uniform sequence in the conveying direction by the conveyor 7. Owing to the relatively sharp slope of the slide path, the logs will lie partly on top of each other in the V-shaped space between the conveyor and the slide path. The conveyor will thereby be supplied with wood in such quantities that none of its pusher members or dogs will empty during its upward movement.

In the majority of instances the pusher members will only entrain one log during transport. Exhaustive tests have shown that this is true for 94% of the logs, and only at rare instances will a pusher take more than one log at a time. This is mainly because the speed of the conveyor 7 is much higher than that of the conveyor 6 and because this speed differential is automatically increased when the quantity of wood passed to the conveyor 7 is too great. A secondary reason is because the outwardly facing edge of the pusher members is rounded, thereby preventing said members from hooking into the logs with which they come into contact. Since the speed of conveyor 8 is greater than that of conveyor 7 and the speed of conveyor 9 is in turn greater than the speed of conveyor 8 and these speed differentials are increased when a specific quantity of wood is present on the slide paths between the conveyors, there is very little risk that a pusher member on conveyor 9 will pick up more than one log at a time.

The reason for the more gentle slope of slide paths 42 and 43 is that for the purpose of separating the logs it is not desirable that they should slide down towards the conveyor at such a speed that they become superposed, one on the other. This naturally applies in particular to slide path 43, which has the gentlest slope.

Subsequent to the logs separated on conveyor 9 being aligned by means of the guide plates 77 and the rollers 44, they are sorted and marked according to type and grade of wood and dimensions, and then discharged from the conveyor to the feed station.

Each log on the slide path exerts by virtue of its weight a certain pressure on the preceding logs. The more logs in front of a certain log the greater the pressure acting on the log. When the wood is relatively twisted and has an abundance of branch stubs or knots a higher pressure is required on the logs to ensure positive engagement with the pusher members of the next-following conveyor than wood which is straighter and cleaner. This pressure can be regulated in a simple manner, by moving the photocells vertically along the frame wall in the manner described. If during operation a switch is made from a straight, relative clean wood such as spruce to a crooked, knotty wood such as birch or to a mixture of these two woods the photocells and light sources are moved upwards in the frame, while in reverse conditions they are moved downwards. In the case of different cross-sectional dimensions of the wood, the photocells and light sources are adjusted to a position in which they are located at approximately the same distance from the bottom of the slide path and the centre line of the logs. This ensures that the photocells can definitely be actuated by the logs. This adjustment can be omitted, however, if the described units comprising photocell and light source are each replaced with two or more units arranged one above the other and capable of being moved vertically along the frame walls.

A number of modifications of the invention are possible without departing from the spirit of the invention. The conveyors and slide paths need not necessarily slope at the angles given in the embodiment illustrated in the drawings which are preferred but these angles may vary within the ranges stated. Accordingly, the angle subtended by the conveyor to the horizontal may well fall within the range from about 35° to about 55°, and in the case of slide paths 41, 42, 43 of said apparatus from about 35° in about 55°, from 20° to 50°, and from 10° to 40°, respectively. The speed of conveyors 5, 6, 7, 8, 9 may also be varied within the scope of the invention, and may be for respective conveyors in the sequence quoted as much as about 70% higher or 90% lower than those given in the described embodiment.

Furthermore, the cross section of the pusher member may differ from that described, and the radius of the rounded corner and the angles quoted with respect to said member may be other than those disclosed. Neither is the number of chains cooperating with the conveyors restructed to the number given described in the embodiment but, similarly this number may vary with the number of rollers 44, in dependence on the maximum conveivable length of the wood to be sorted. It is also possible to exclude the two horizontal conveyors, or to replace them with sloping conveyors, and to load the wood off from the truck directly into the space between the first sloping conveyor and the slide path. Neither is the number of plates 73 of the regulating means 40 restricted to four, as described but the plates may be replaced by one single plate, or an arbitrary number of plates, which extends or extend across the conveying path.

Having regard to the foregoing disclosure, the following is claimed as the inventive and patentable features thereof:

1. A process for conveying elongated objects such as logs one-by-one and sideways from a receiving station to a delivery station, which comprises conveying the objects along a horizontal path to an equalizing station; sending the objects on from the equalizing station one at a time, at a rate of feed controlled to send on during a predetermined unit period of time a predetermined quantity of objects; transporting the objects to and moving the objects up at least two sequentially arranged stages, each upwardly inclined at an angle to the horizontal within the range from about 35° to 55°, such that the objects being conveyed seek one at a time to assume a horizontal position thereon, with their longitudinal axis perpendicular to the conveying direction; while moving the objects more rapidly through each successive upwardly inclined stage so as to separate the objects one from the other, and cause them to be delivered one-by-one to the delivery station.

2. An apparatus for conveying elongated objects one-by-one and sideways from a receiving station to a delivery station, comprising at least two sequentially-and approximately horizontally-arranged conveyors, adapted to feed the objects horizontally, and at least two sequentially-arranged and semi-vertically-inclined conveyors placed after the horizontally-arranged conveyors in the conveying direction, and inclined to carry the objects upwardly at an angle to the horizontal within the range from about 35° to 55°, each successive conveyor being adapted to operate at a higher rate of speed than the next-preceding conveyor in the direction of the receiving station, the increasing speed and the upward angle of inclination of the conveyors cooperating to separate the objects one from another and means disposed between the first two sequentially and horizontally arranged conveyors to control the quantity of objects proceeding, per unit time, from the first horizontal conveyor to the second.

3. An apparatus according to claim 2 including an additional horizontally-arranged conveyor connecting with the last inclined conveyor and arranged to deliver the objects one-by-one to the receiving station.

4. An apparatus in accordance with claim 2 including a downwardly inclined means connecting the end of the next-preceding conveyor to the base of each upwardly inclined conveyor, along which means the objects may slide downwardly into engagement with the upwardly inclined conveyor.

5. The apparatus of claim 2 in which each conveyor includes at least two parallel chains, and at least one of the upwardly inclined conveyors has a plurality of pusher members attached to the chains, to engage and carry the objects upwardly therewith.

6. The apparatus of claim 5 in which the pusher members have a substantially triangular cross-section, with one side parallel with the chains and affixed thereto, and the edge facing away from the chains is rounded off, and comprises the highest portion of the pusher member as the members are moved by the chain conveyor in the transporting direction.

7. The apparatus of claim 2 in which the means controlling the quantity of objects proceeding from the first to the second horizontally arranged conveyor comprises a shaft, at least one plate pivotally mounted along one side on the shaft, and regulating means connecting the plate with the drive motor of the conveyor, the shaft and the plate extending conversely of the conveyor path, so that when the plate hangs freely, the downwardly directed side edge thereof is located at a distance from the conveyor path, the regulating means being adapted to reduce the speed of the motor when the plate is swung in the conveying direction to a predetermined angle to the vertical.

8. The apparatus of claim 7 in which the shaft and the plates mounted on the shaft are also moveable vertically.

9. The apparatus of claim 2 comprising a feed registering and regulating means arranged to encounter the objects moving to the base of at least one upwardly inclined conveyor, connected to the drive motor of the conveyor, and adapted to regulate the speed of the motor according to the objects moving past the said means.

10. The apparatus of claim 9 in which the registering means comprises a source of light, a photocell and a time relay, the light source and the photocell being arranged on opposite sides of the conveyor path in a manner such that the light beam is interrupted when more than one of the objects is piled on top of another, and the time relay is connected to the photocell so that the signal sent to the motor as a result of changes in the intensity of the light are delayed, the photocell and the light source being capable of movement vertically and in synchronization with each other.

11. The apparatus of claim 2 in which a conveyor is disposed at the discharge end of the last inclined conveyor, and so constructed as to extend partially horizonally at the delivery station end, and partially inclined to the horizontal at the upper end of the inclined conveyor; and aligning means arranged at the horizontal portion of such conveyor for moving the conveyed objects in their longitudinal direction, so that when discharged from the apparatus the objects are aligned or their ends are approximately equidistant from the longitudinal axis of the apparatus.

12. The apparatus of claim 11 in which the aligning means comprises a number of rotatably mounted rollers connected to a motor and arranged in spaced relationship across the conveying path, parallel to each other and to the conveying direction, so that the objects being conveyed rest on the roller while passing the rollers during transport, the rollers on opposite sides of the axis of the apparatus rotating in different directions when the motor is activated, so that each roller seeks to move an object resting thereon toward such symmetry line.

13. A process for conveying elogated object such as logs one-by-one sideways from a receiving station to a delivery station, which comprises conveying the objects along a horizontal path to an equalizing station; sending the objects on from the equalizing station one at a time, at a rate of feed controlled to send on during a predetermined unit period of time a predetermined quantity of objects; transporting the objects to and moving the objects up at least two sequentially arranged stages, each upwardly inclined at an angle to the horizontal of approximately 45° such that the objects being conveyed seek one at a time to assume a horizontal position thereon, with their longitudinal axis perpendicular to the conveying direction; while moving the objects more rapidly through each successive upwardly inclined stage so as to separate the objects one from the other, and cause them to be delivered one by one to the delivery station.

14. An apparatus for conveying elongated objects one-by-one sideways from a receiving station to a delivery station, comprising at least two sequentially-and approximately horizontally-arranged conveyors, adapted to feed the objects horizontally, and at least two sequentially-arranged and semi-vertically-inclined conveyors placed after the horizontally-arranged conveyors in the conveying direction, and inclined to carry the objects upwardly at an angle to the horizontal of approximately 45°; each successive conveyor being adapted to operate at a higher rate of speed than the next-preceding conveyor in the direction of the receiving station, the increasing speed and the upward angle of inclination of the conveyors cooperating to separate the objects one from another; and means disposed between the first two sequentially and horizontally arranged conveyors to control the quantity of objects proceeding, per unit time, from the first horizontal conveyor to the second.

* * * * *